May 4, 1965 F. C. PALLER 3,181,852
SHOCK ABSORBER SPRING UNIT
Filed March 8, 1963
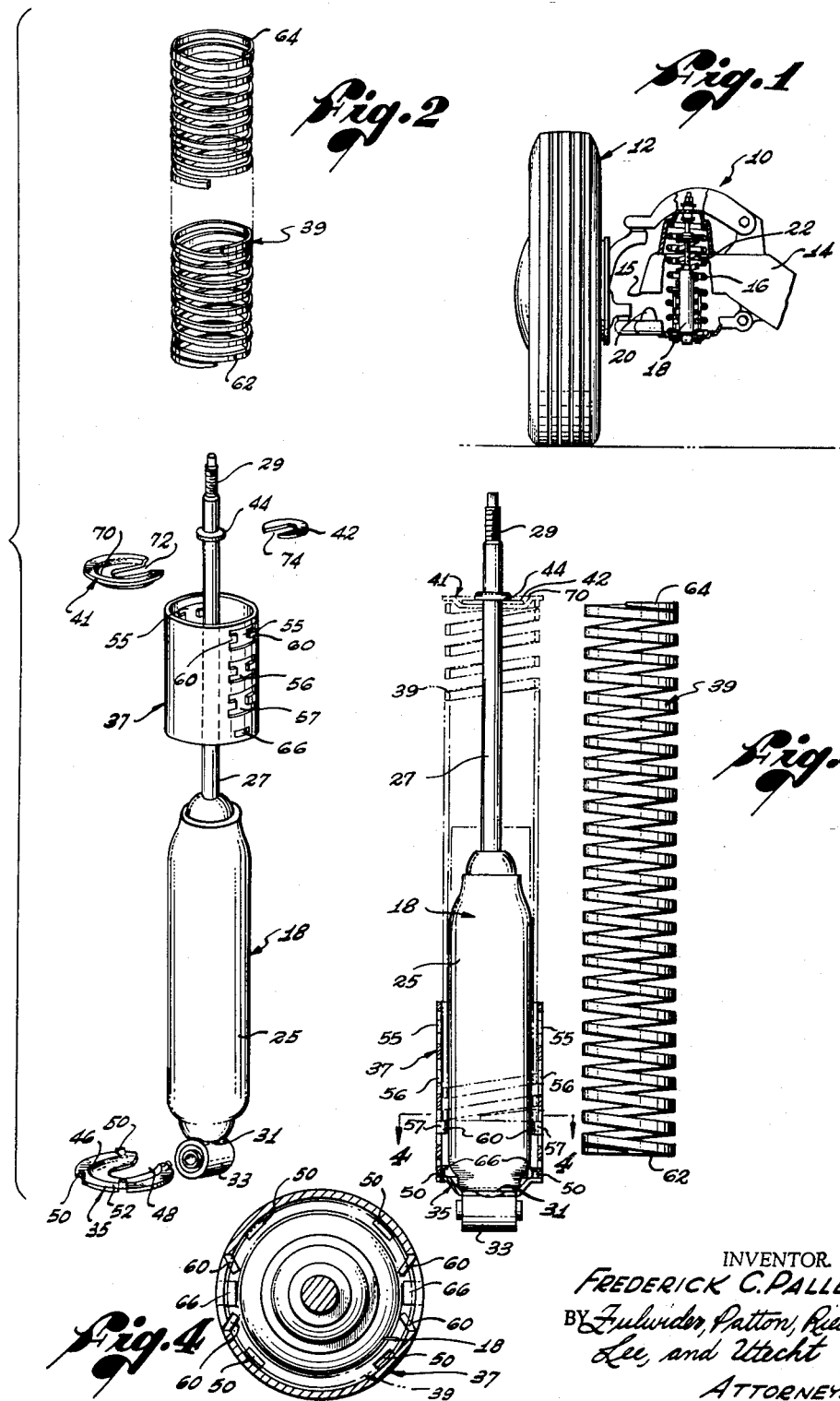
INVENTOR.
FREDERICK C. PALLER
BY Fulwider, Patton, Rieber
Lee, and Utecht
ATTORNEYS 3,181,852
SHOCK ABSORBER SPRING UNIT
Frederick C. Paller, Northridge, Calif., assignor to Superior Industries, Inc., North Hollywood, Calif., a corporation of California
Filed Mar. 8, 1963, Ser. No. 263,862
9 Claims. (Cl. 267—8)

This invention relates generally to automotive suspension systems, and more particularly to improved stabilizing units for the front suspension of a motor vehicle.

As is well known, an automotive suspension comprises springs and related structure between the wheels and frame of a motor vehicle for supporting the vehicle body and frame upon the wheels and providing a means of absorbing road shock caused by passage of the wheels over irregularities. Generally speaking, four types of springs are used for such suspensions, coil springs, leaf springs, torsion bar springs, and air springs. For example, an automotive suspension typical of the type commonly in use today employs coil springs at the front and leaf springs at the rear. The weight of the vehicle applies an initial compression to the springs. When the wheels encounter irregularities in the road, the springs further compress or expand to absorb most of the shock. The springs may also compress due to heavy loading of the vehicle, or due to banking of the vehicle while negotiating turns at high speeds.

Shock absorbers are also used at each wheel to restrain excessive spring movement and prevent prolonged spring oscillations, thereby avoiding a rough ride. A typical shock absorber contains a piston that moves within a cylinder as the wheel moves up and down with respect to the vehicle frame. As the piston moves, it forces a fluid through a system of valved orifices, with a consequent damping effect. The latter imposes a restraint upon excessive flexing and rate of flexing, either by compression or expansion, of the springs used in the vehicle suspension.

Although the aforedescribed suspension arrangements have generally served their purpose, they have not always proven entirely satisfactory under all conditions of service. In this connection, as the suspension springs weaken and/or shock absorbers become worn, the suspension has a tendency to sag. Under these conditions, poor suspension alignment and excessive tire wear are likely to result. Moreover, stability of ride of the vehicle is also degraded in view of the frequent "bottoming" due to reduced road clearance, excessive front end dive encountered when braking, and excessive side sway of the vehicle during cornering.

In order to minimize these deficiencies, a number of devices have been developed wherein a helper or booster spring surrounds the shock absorber at each wheel and is used to supplement the front suspension, thus minimizing the tendency for the suspension to sag. Such devices have accomplished a substantial improvement in the riding qualities of the vehicles upon which they have been installed.

However, a number of problems have been encountered with the shock absorber spring units which have been heretofore available. In this regard, such units are either directly incorporated into the shock absorber construction itself, and thus necessitate complete replacement of the shock absorber units already on the vehicle, or else the springs have had to be provided in a plurality of different sizes with specially tailored mounting hardware for each of the vast plurality of different types of shock absorbers used upon different motor vehicles. It will be apparent that both of these supplemental arrangements are not only expensive to provide, but also require an extremely large inventory of different components to be maintained by a retailer if he intends to service a large variety of different motor vehicles. Hence, those concerned with the development of shock absorber spring units, for supplementing automotive suspensions, have long recognized the need for universal type units capable of modifying the already existing shock absorbers upon a motor vehicle, and which require only a single type of mounting hardware suitable for use in suspensions of a large variety of different motor vehicles.

Accordingly, it is an object of the present invention to provide a new and improved shock absorber spring unit which overcomes the above and other disadvantages of the prior art.

Another object is to provide a shock absorber spring unit wherein a single unit is capable of substantially universal installation upon a wide variety of different shock absorbers.

A further object of the invention is the provision of shock absorber spring units capable of simply and inexpensively reinforcing the existing shock absorbers of an automotive suspension, without necessitating vendors of such units to maintain a large inventory of different spring units for the many different shock absorbers likely to be encountered.

Still another object is to provide shock absorber spring units which all use a single size spring and adjustable spring mounting means to adapt the units for a wide variety of different size shock absorbers, each unit being capable of providing properly controlled spring compression regardless of the different shock absorber lengths encountered.

Yet another object of the present invention is the provision of simplified means in a shock absorber spring unit for accurately aligning the spring unit with respect to the shock absorber upon which it is installed.

A still further object is to provide a new and improved and more reliable retaining means for a spring unit installed upon a shock absorber.

The above and other objects and advantages of this invention will be better understood by reference to the following detailed description, when considered in connection with the accompanying drawings of an illustrative embodiment thereof, and wherein:

FIGURE 1 is a fragmentary, elevational view illustrating a typical installation of a booster spring unit upon a shock absorber in an automotive suspension;

FIGURE 2 is an exploded assembly view of a complete shock absorber spring unit, in accordance with the present invention;

FIGURE 3 is an elevational view of an assembled shock absorber spring unit, and illustrates the manner in which the mounting means is selectively adjusted for controlled spring compression with shock absorbers of different lengths; and FIGURE 4 is a sectional view, taken along the line 4—4 in FIGURE 3, and illustrates the manner in which the various tabs function to align the spring unit with respect to the shock absorber, as well as control the compression of the spring.

Referring now to the drawings, and particularly to FIGURE 1 thereof, there is shown a typical automotive suspension 10 for coupling a tire and wheel assembly 12 to the frame 14 of a motor vehicle. The suspension 10 is supported by means of a conventional coil spring 16, and a shock absorber 18 to restrain and damp spring movement. The combined effect of the large coil spring 16 and the shock absorber 18 is to prevent the end 15 of the frame 14 from "bottoming" against a limit stop 20, except under the most severe of road conditions encountered while driving the vehicle. However, as previously indicated, worn shocks and/or weak or overloaded springs tend to result in sagging of the suspension 10. Hence, an auxiliary booster or helper spring 22 surrounds the shock absorber 18 in FIGURE 1 and biases the piston rod of the shock absorber to its fully extended position, whereby additional suspension support and shock absorber damping action is afforded.

Referring now more particularly to FIGURES 2 and 3 of the drawings, the structural components of my improved booster spring unit are illustrated in relation to a shock absorber 18 upon which it is intended to install the unit. The shock absorber 18 comprises a main body portion 25 which contains a fluid cylinder and valving arrangement (not shown) for the shock absorber. A retractable and extendable shock absorber piston rod 27 extends from the upper end of the main body 25, as seen in FIGURES 2 and 3, and the distal end of the rod may be threaded, as at 29, for appropriate installation in the automotive suspension 10 of FIGURE 1. The proximal end of the rod 27 is secured to a shock absorber piston (not shown) within the main body 25. The lower end of the main body 25 of the shock absorber typically tapers to a neck 31 of reduced diameter, followed by an integral mounting sleeve 33 or some other form of appropriate mounting structure.

Basically, the improved booster spring unit of the present invention includes a lower retaining ring 35, an adjustment sleeve 37 for centering the entire booster spring unit and adjustably controlling the compression of a spring 39, and an upper retaining ring 41 and disc-like keeper element 42 which fit beneath a locking collar 44 carried upon the shock absorber piston rod 27.

The lower retaining ring 35 is dished at 46 to conform to the typical curved lower end of the shock absorber 18, and the retaining ring is provided with a slot 48 so that the ring can slide into place upon the shock absorber neck 31. The lower retaining ring 35 is also provided with a plurality of upright tabs 50 extending perpendicular to the peripheral rim 52 of the ring, and spaced inwardly from the outer peripheral edge of the ring a distance equal to the wall thickness of the adjustment sleeve 37. Hence, as best observed in FIGURES 3 and 4, when the lower retaining ring 35 is installed upon the shock absorber 18, and the adjustment sleeve 37 is passed over the shock absorber so that the lower end of the sleeve abuts the rim 52 of the retaining ring, the upright tabs 50 will abut the inner surface of the sleeve and thereby center the sleeve relative to the retaining ring and the shock absorber.

The adjustment sleeve 37 is provided at spaced intervals along the length of the sleeve with a plurality of pairs of diametrically opposed H-shaped apertures 55–57. Each aperture, by virtue of its shape, provides the sleeve with a pair of tabs 60 which may be readily bent inwardly (see FIGURES 3 and 4) by the simple wedging action of a screwdriver inserted into the respective aperture whose tabs are to be deflected. By selecting a specific pair of the apertures 55–57, and bending the tabs 60 of that pair inwardly, the depth of insertion of the lower end 62 of the spring 39 into the adjustment sleeve 37 may be readily controlled.

FIGURE 3 illustrates the manner of installing the spring element 39 and adjusting its compressive state for a shock absorber of any given size. In selecting a pair of apertures, the tabs 60 of which will limit the depth of insertion of the spring 39, the piston rod 27 of the shock absorber is first adjusted to its fully extended position. The spring 39, which is a standard length element supplied with all of the booster spring units of my invention, is placed side by side adjacent the shock absorber, with the upper end 64 of the spring in alignment with the collar 44 upon the piston rod 27. Since the spring 39 is to be used with a variety of shock absorbers of different lengths, the lower end 62 of the spring will be in alignment with the tabs 60 of one of the pairs of apertures 55, 56, or 57. Whichever pair of apertures is in alignment with the lower end 62 of the spring, the tabs 60 of the next higher pair of apertures are bent inwardly, so that the installed spring will experience a predetermined minimum degree of compression when the shock absorber 18 is fully extended. Hence, if the lower end 62 of the spring is in alignment with the pair of apertures 57, the tabs 60 of the apertures 56 would be bent inwardly to limit the depth of insertion of the spring into the sleeve 37. On the other hand, if the lower end of the spring turned out to be initially in alignment with the pair of apertures 56, the tabs of the next higher pair of apertures 55 would be used to compress the spring 39. In bending any set of tabs 60 inwardly, care is taken to avoid bending the tabs further than the inside diameter of the spring 39, so that direct physical contact of the tabs with the main body 25 of the shock absorber is avoided.

As observed in FIGURES 2, 3 and 4, the lower end of the adjustment sleeve 37 is provided with an additional pair of diametrically opposed, inwardly directed tabs 66. These tabs 66 are essentially non-adjustable and are provided during manufacture of the adjustment sleeve 37 to serve a dual function. First, these tabs have an additional centering effect upon the sleeve 37, in that they limit the tendency for the sleeve to skew out of alignment with the main body 25 of the shock absorber, especially when the tabs 60 of an upper pair of apertures, such as 55, are used to compress the spring 39. Second, the tabs 66 can be used as an additional set of limit tabs, in the same manner as the tabs 60 are used, where the booster spring unit is to be installed on an extremely short shock absorber.

With the lower retaining ring 35 installed at the base of the shock absorber 18, and the adjustment sleeve 37, with its selected set of tabs 60 bent inwardly, has been installed over the shock absorber and into abutment with the lower retainer ring, the spring 39 is then also passed over the shock absorber and its lower end 62 is inserted into the adjustment sleeve until it abuts the tabs 60 which have been designated for limiting its insertion. The spring 39 is then compressed slightly so that the upper retaining ring 41 can slide over the upper end 64 of the spring and under the collar 44 on the piston rod 27 of the shock absorber. With the upper retaining ring 41 thus installed, and the spring 39 still slightly compressed, the keeper element 42 is slid onto the rod 27 between the upper retaining ring and the collar 44 to lock the retaining ring 41 and spring 39 into place.

It will be noted in FIGURES 2 and 3 that the upper retaining ring 41 is dished at 70 to provide a centering shoulder upon its underside for the upper end 64 of the spring 39, and to provide a well 70 in its upper face for receipt of the keeper element 42. Both the retaining ring 41 and the keeper element 42 are each slotted at 72 and 74, respectively, to facilitate their insertion upon the rod 27 of the shock absorber. Once the disc-like keeper element 42 has been seated in the well 70 upon the upper face of the retaining ring 41, the spring 39 biases the keeper element to the bottom of the well. The keeper element 42 is normally installed from the opposite side of the rod 27 than the retaining ring 41 (see FIGURE 2). Hence, an effective locking interaction is provided, since the sides of the retaining ring defining the well 70 prevent the keeper element from being dislodged from the rod 27, while the keeper element simultaneously prevents the retaining ring from being dislodged from the rod.

The present invention satisfies a long existing need in the automotive suspension field for a simple and relatively inexpensive shock absorber spring unit capable of universal installation and adjustment upon shock absorbers of different size, thus obviating the need for a large inventory of different spring units to fit each shock absorber of different size. The present invention further provides an extremely reliable, self-aligning, shock absorber spring unit with improved means for locking the spring unit in its properly installed position.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:

1. In a suspension system including a shock absorber, a booster spring unit for said shock absorber, comprising:
    a sleeve surrounding said shock absorber;
    first retaining means engaging a portion of said shock absorber, said first retaining means including a retaining ring having a plurality of tabs extending perpendicular to said retaining ring and offset inwardly from the outer edge periphery of said retaining ring, said tabs engaging the inner surface of said sleeve at one end thereof and thereby center said sleeve with respect to said retaining ring;
    second retaining means engaging a portion of said shock absorber spaced apart from the portion of said shock absorber engaged by said first retaining means;
    a coil spring in coaxial alignment with said sleeve and having one end in abutment with said second retaining means, the other end of said spring being inserted into said sleeve through the end of said sleeve opposite that in abutment with said first retaining means;
    and means within said sleeve for variably limiting the depth of insertion of said spring into said sleeve.

2. A booster spring unit as set forth in claim 1, wherein said second retaining means includes a slotted retaining ring having a well in one face thereof, and a similarly slotted, substantially planar, keeper element adapted to seat in said well.

3. In a suspension system including a shock absorber, a booster spring unit for said shock absorber, comprising:
    first and second substantially circular retaining rings engaging spaced apart portions of said shock absorber;
    a circular, cylindrical adjustment tube surrounding said shock absorber and having one end in abutment with the first of said retaining rings, said adjustment tube having a plurality of pairs of diametrically opposed H-shaped apertures at spaced intervals along the length of said tube, each H-shaped aperture defining a pair of deformable tab elements adapted to be bent so as to extend into said tube;
    a coil spring in coaxial alignment with said tube and having one end in abutment with the second of said retaining rings, the other end of said spring being inserted into said tube through the end of said tube opposite that in abutment with said first retaining ring, the depth of insertion of said spring into said tube being limited by the selected pairs of diametrically opposed tabs extending into said tube.

4. A booster spring unit as set forth in claim 3, wherein said first retaining ring includes a plurality of tabs extending substantially perpendicular to said retaining ring and spaced inwardly from the outer peripheral edge of said retaining ring a distance substantially equal to the thickness of said tube, said tabs engaging the inner face of said adjustment tube when said adjustment tube abuts said retaining ring.

5. A booster spring unit as set forth in claim 3, wherein said second retaining ring is provided with a well receiving a disc-like keeper element.

6. A stabilizing unit for use in an automotive suspension, comprising:
    a shock absorber having a main body and a piston rod extending from one end of said main body;
    a collar carried upon said rod intermediate the distal and proximal ends of said rod;
    a retaining ring having a slot therein engaging the end of said main body opposite that from which said piston rod extends;
    a cylindrical adjustment sleeve surrounding said main body and having one end in abutment with said first retaining ring, said sleeve having a plurality of pairs of diametrically opposed H-shaped apertures at spaced intervals along the length of said sleeve, each H-shaped aperture defining a pair of tabs selectively deformable inwardly to positions within said sleeve;
    a coil spring surrounding said shock absorber and coaxial with said shock absorber and said sleeve, said coil spring having one end inserted into said tube to a depth limited by the inward positioning of one of said pairs of diametrically opposed tabs;
    a second retaining ring having a slot therein engaging said piston rod, said second retaining ring being in abutment with the other end of said spring and being biased thereby away from the main body of said shock absorber, said second retaining ring having a well therein;
    and a slotted, substantially disc-like keeper element engaging said rod and seating within the well of said second retaining ring, whereby said keeper element is biased into abutment with said collar upon said piston rod.

7. A stabilizing unit as set forth in claim 6, wherein said first retaining ring includes means for centering said adjustment sleeve relative to said first retaining ring.

8. A stabilizing unit as set forth in claim 6, including additional tab means embodied by said adjustment sleeve for centering said sleeve relative to the main body of said shock absorber.

9. In a suspension system including a shock absorber, a booster spring unit for said shock absorber, comprising:
    first and second substantially circular retaining rings engaging spaced apart portions of said shock absorber;
    a circular, cylindrical adjustment tube surrounding said shock absorber and having one end in abutment with the first of said retaining rings, said adjustment tube having a plurality of pairs of diametrically opposed apertures at spaced intervals along the length of said tube, each aperture defining at least one deformable tab element adapted to be bent so as to extend into said tube; and
    a coil spring in coaxial alignment with said tube and having one end in abutment with the second of said retaining rings, the other end of said spring being inserted into said tube through the end of said tube opposite that in abutment with said first retaining ring, the depth of insertion of said spring into said tube being limited by the diametrically opposed tabs extending into said tube.

References Cited by the Examiner

UNITED STATES PATENTS

| | | | |
|---|---|---|---|
| 706,071 | 8/02 | Bauve. | |
| 722,909 | 3/03 | Runge | 287—57 |
| 924,341 | 6/09 | Gerisch. | |
| 1,548,053 | 8/25 | Mead | 248—356 X |
| 1,571,000 | 1/26 | Eustis | 211—123 X |
| 1,600,060 | 9/26 | Nolte | 24—256 X |
| 2,225,031 | 12/40 | Cauldwell | 85—51 X |
| 2,571,449 | 10/51 | Hobbs | 267—8 X |
| 2,574,120 | 11/51 | Rich | 137—540 X |
| 2,756,045 | 7/56 | Savory | 267—8 |

FOREIGN PATENTS

| | | |
|---|---|---|
| 1,059,988 | 11/53 | France. |
| 745,843 | 3/56 | Great Britain. |

ARTHUR L. LA POINT, *Primary Examiner.*